United States Patent [19]
Freeman

[11] Patent Number: 6,057,935
[45] Date of Patent: May 2, 2000

[54] PRODUCING AN ENHANCED RASTER IMAGE

[75] Inventor: Josh E. Freeman, San Jose, Calif.

[73] Assignee: Adobe Systems Incorporated

[21] Appl. No.: 08/998,119

[22] Filed: Dec. 24, 1997

[51] Int. Cl.$^7$ ............................. G06T 5/00; G06K 15/02
[52] U.S. Cl. ........................... 358/1.9; 382/261; 382/263
[58] Field of Search ..................................... 395/109, 102; 382/254, 266, 269, 270, 274, 261, 260, 263, 264; 358/447, 448, 455, 458, 532, 465, 466, 1.9

[56] References Cited

U.S. PATENT DOCUMENTS

| | | |
|---|---|---|
| 4,937,761 | 6/1990 | Hassett . |
| 5,235,435 | 8/1993 | Schiller . |
| 5,241,653 | 8/1993 | Collins et al. . |
| 5,249,242 | 9/1993 | Hanson et al. . |
| 5,303,334 | 4/1994 | Snyder et al. . |
| 5,447,811 | 9/1995 | Buhr et al. ............................... 358/524 |

OTHER PUBLICATIONS

Adobe Photoshop 4.0 User Guide, "Chapter 6: Making Color and Tonal Adjustments,"Sep. 1996, U.S.A.
Adobe Photoshop 4.0 User Guide, "Chapter 12: Using Filters," Sep./1996, U.S.A.

*Primary Examiner*—Scott Rogers
*Attorney, Agent, or Firm*—Fish & Richardson P.C.

[57] ABSTRACT

Methods and apparatus for producing an enhanced raster image from an original raster image are described. A set of initial sharpness values are derived from the initial intensity values of the pixels of the image. The initial sharpness values are mapped to a set of corresponding enhanced sharpness values, and a set of enhanced intensity values are derived from the enhanced sharpness values to produce the enhanced raster image. As a result of the mapping, one or more of the enhanced sharpness values are greater than the corresponding initial sharpness values and one or more of the enhanced sharpness values are less than the corresponding initial sharpness values. In another aspect, a background intensity value is determined for each pixel of the raster image based upon the initial intensity values for a plurality of pixels of the raster image, and the set of initial sharpness values is derived from the background intensity values and the initial intensity values. In another aspect, a graphical representation of the mapping between initial sharpness values and a set of enhanced sharpness values is produced. The initial sharpness values are mapped to a different set of enhanced sharpness values in response to user actions upon the graphical representation.

28 Claims, 6 Drawing Sheets

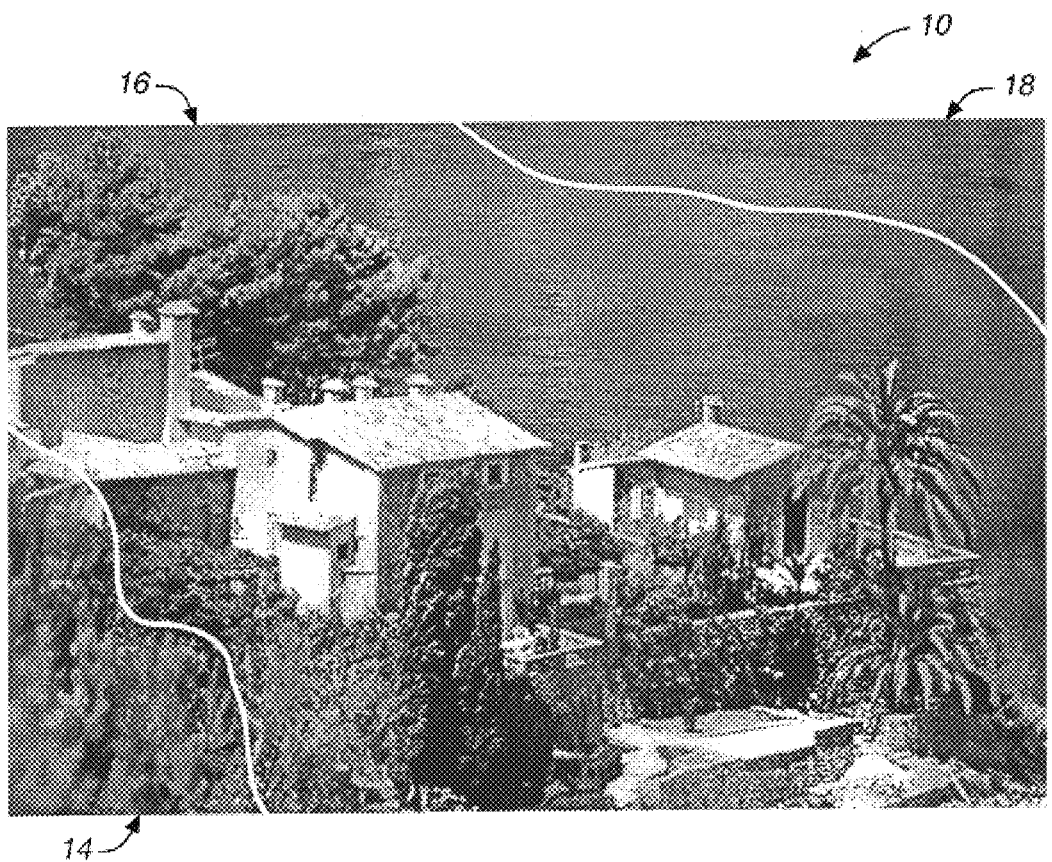
FIG._1

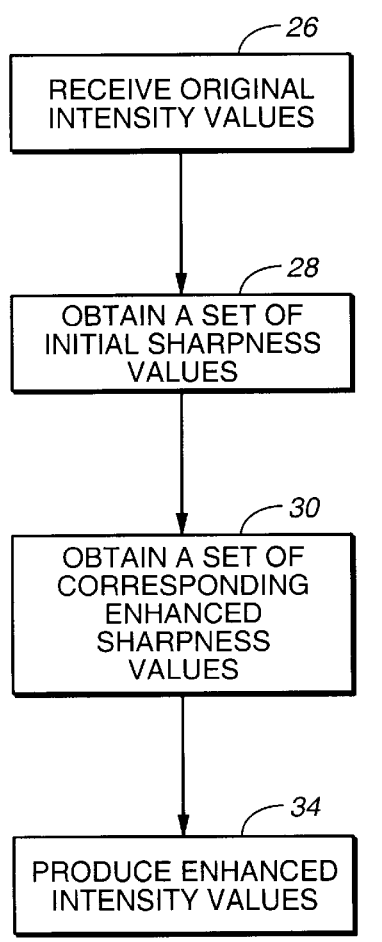
FIG._3A
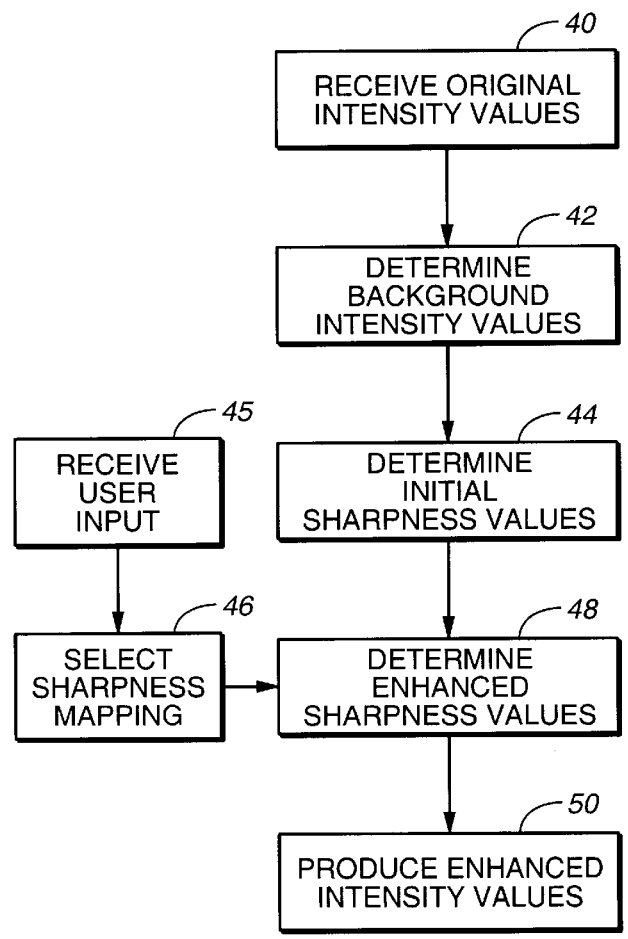
FIG._3B

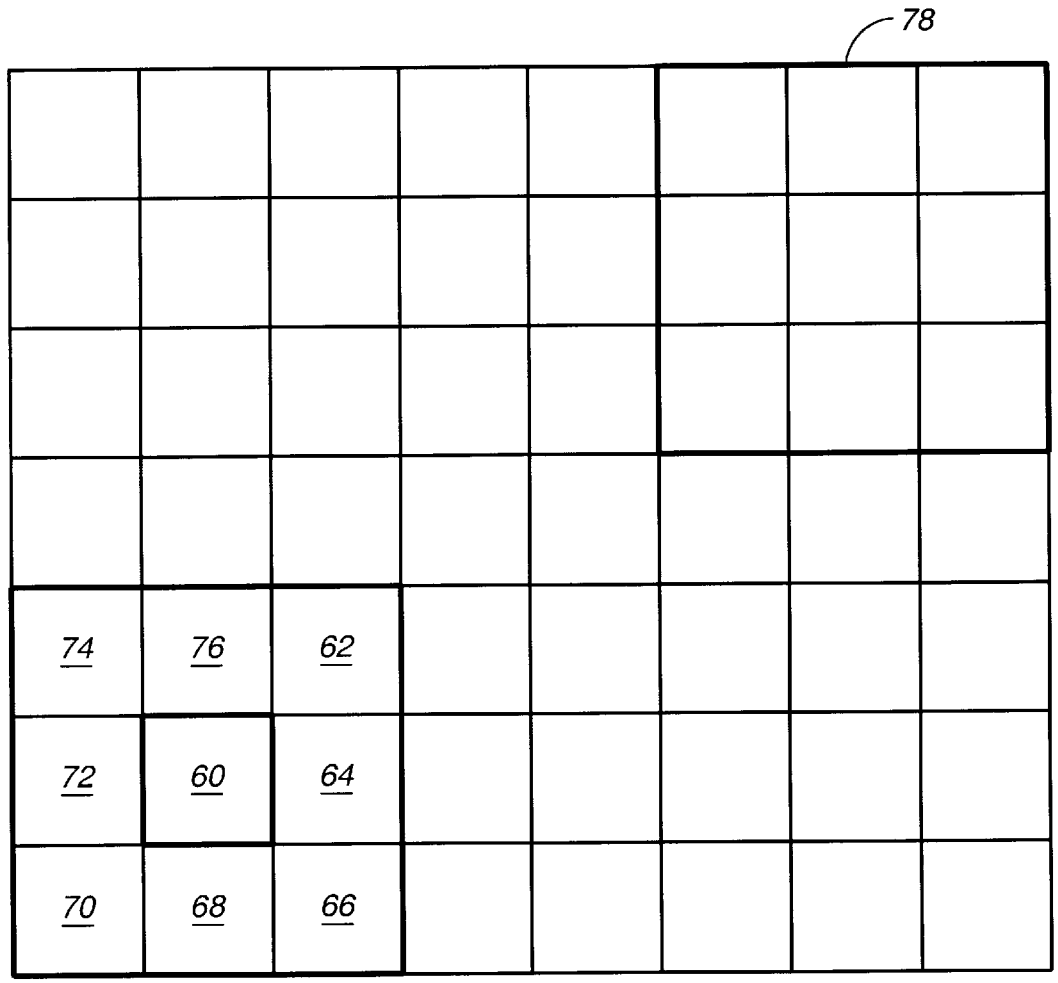
FIG._4A
FIG._4B

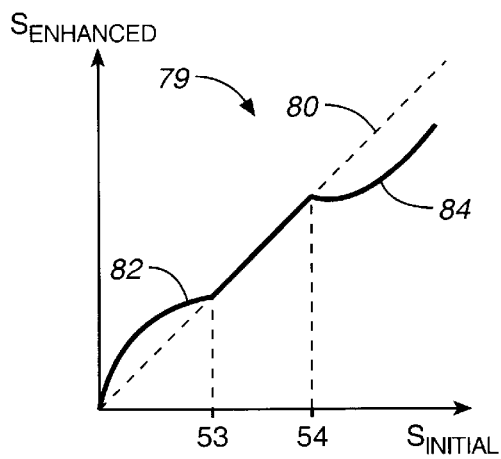
FIG._5A
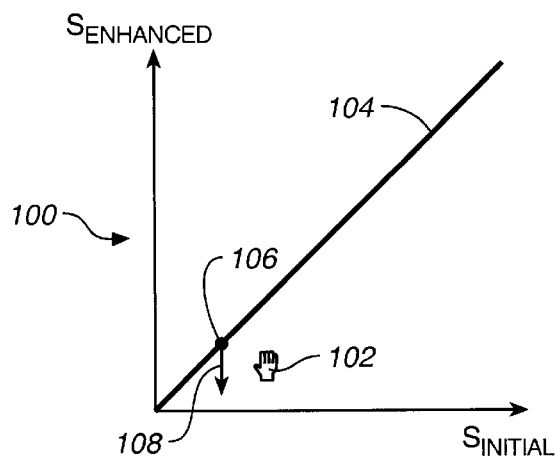
FIG._6A
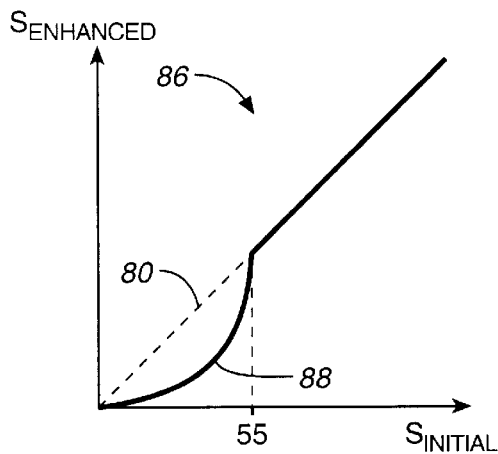
FIG._5B
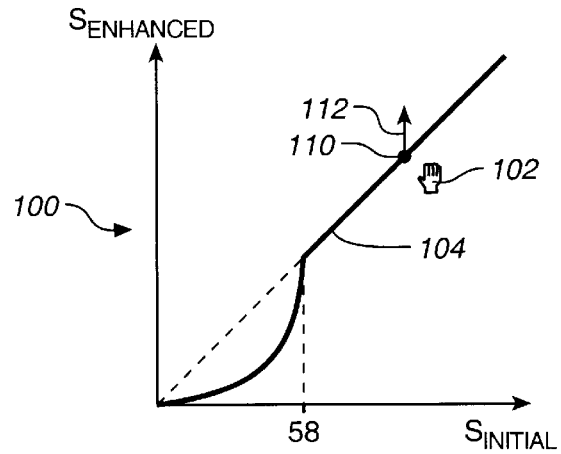
FIG._6B
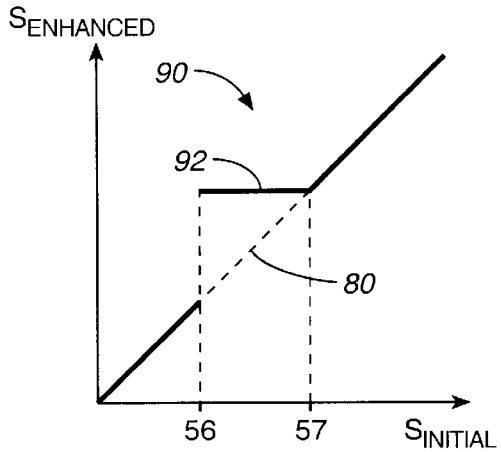
FIG._5C
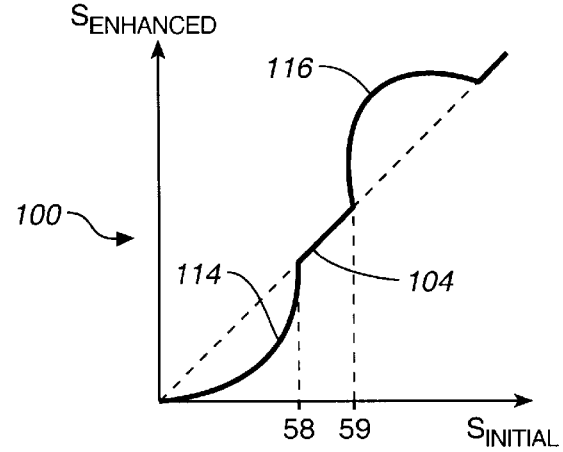
FIG._6C

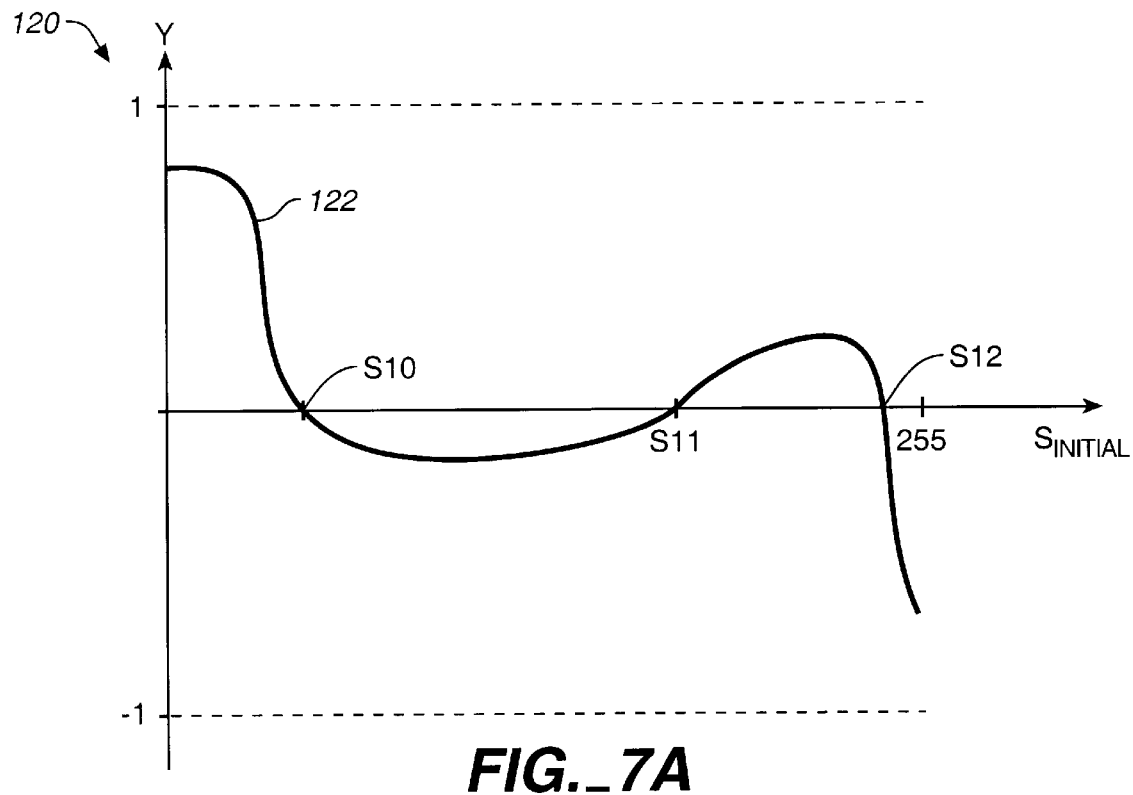
FIG._7A
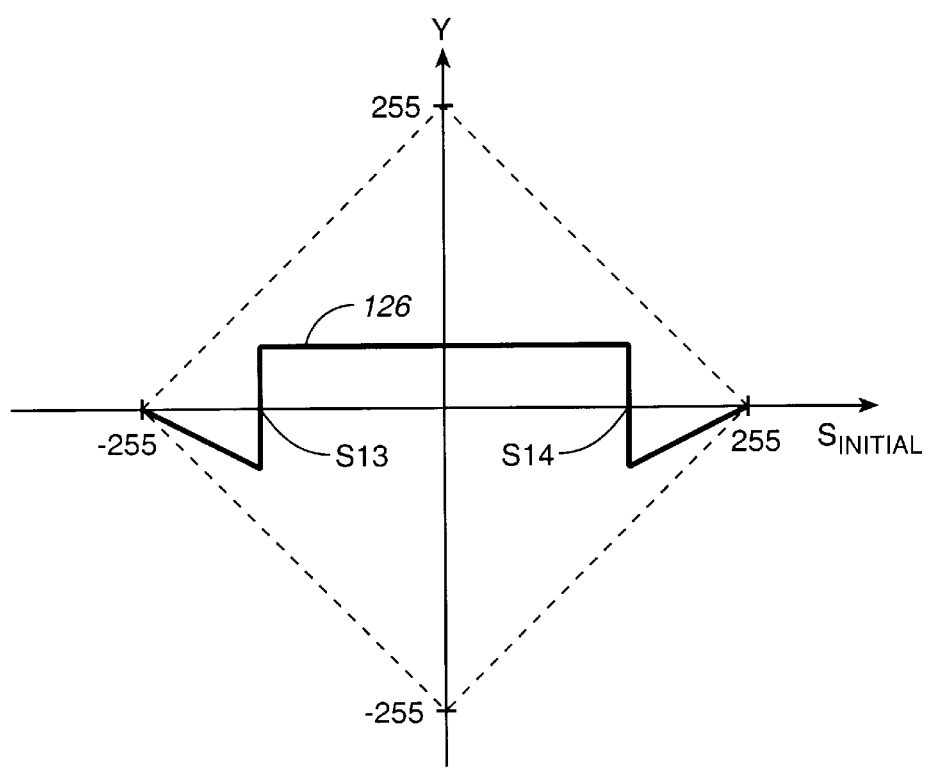
FIG._7B

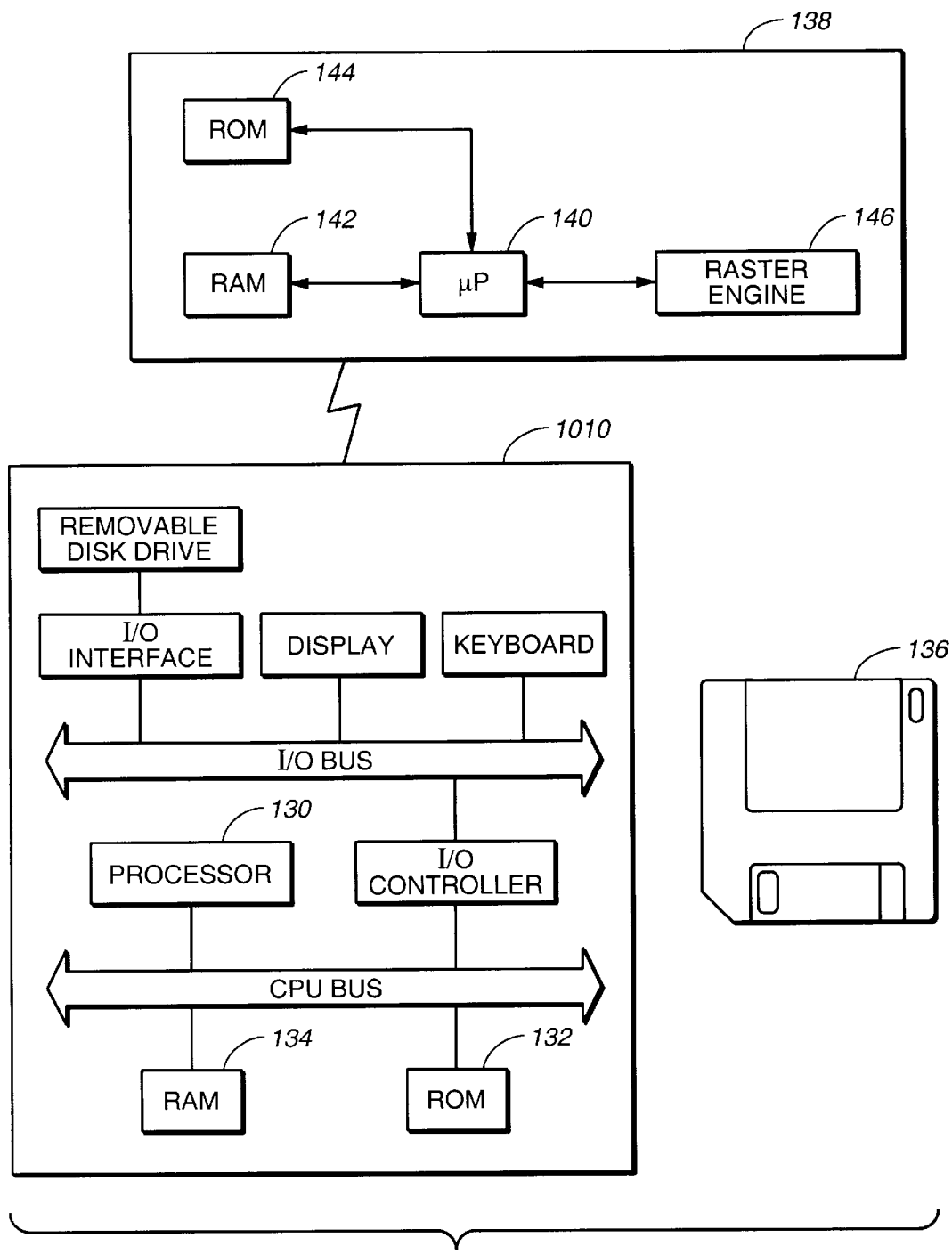
FIG._8

PRODUCING AN ENHANCED RASTER IMAGE

BACKGROUND OF THE INVENTION

The invention relates to methods and apparatus for producing an enhanced raster image.

Raster images use a grid of small picture elements (pixels) to represent graphics. Raster images may contain one or more channels that represent information about the color elements in the image. In the red, green, blue (RGB) color model with a depth of 8 bits, for example, there are three channels, each of which can take on a value of 0 to 255 so that any one of over 16 million different colors can be assigned to any pixel in the raster image. A raster imaging system typically produces a visual representation of a raster image by scanning successive lines of pixels onto a surface. Common raster imaging systems include laser xerographic, inkjet, electrostatic, thermal transfer, magnetographic, dot matrix, ion deposition, laser film, and laser erosion systems. The arrangement of pixels on a printed page or on a CRT screen gives a viewer the illusion that a continuous image is being observed. The degree to which the pixel arrangement can simulate an ideal image depends upon a number of characteristics of the imaging system, including spatial addressability, pixel size, dynamic density range of pixels (number of gray or color levels), placement consistency, and consistency of the rendering process.

Sometimes an image will be distorted as a result of an image-capturing process. For example, some regions of a photographic image may be in focus (sharp) and other regions may be out of focus (blurry). An image is generally in focus when features of the image are defined by edges with sharp intensity transitions; an image is out of focus when the edge regions are not characterized by sharp intensity transitions. One way to reduce this kind of distortion is to increase the relative intensities of the pixels located at the edges of features in the image. For example, as described in Adobe® Photoshop® 4.0 *User's Guide*, published by Adobe Systems Incorporated (1996), the Adobe® Photoshop® imaging processing software, version 4.0, includes an Unsharp Mask filter that enables a user to increase the relative intensity values of edge pixels by a user-selected factor (specified as a percentage of the relative intensity between adjacent pixels). A user can also specify a relative intensity threshold (with a value from 0 to 255), whereby only adjacent pixels with relative intensities that are above the threshold will be modified. The Unsharp Mask filter locates every two adjacent pixels with a difference in intensity values that is greater than the threshold, and then increases the relative intensity between these pixels by the user-specified factor. The user can also specify the number of surrounding pixels to which the sharpening effect will be applied. The Unsharp Mask filter applies the same sharpening factor to each pixel with a relative intensity value above the threshold.

The Adobe® Photoshop® imaging processing software, version 4.0, also includes a Blur filter and a Custom filter, as well as a number of other image filters. The Blur filter smooths transitions by averaging the pixels where significant color transitions occur in an image. The Custom filter enables a user to reassign a given pixel's intensity value based upon the intensity values of surrounding pixels. The Custom filter allows a user to select the factors by which to multiply the intensity values of a target pixel based on the values of the pixels immediately adjacent to the target pixel. The user then selects a scale factor by which to divide the sum of weighted pixel intensity values and an offset value to be added to the result of the scale operation. Once defined, the Custom filter can be applied to each pixel in the image.

SUMMARY OF THE INVENTION

In one aspect, the invention features a method and an apparatus for producing an enhanced raster image from a raster image having a plurality of pixels with respective initial intensity values. In accordance with this inventive image-enhancing scheme, a set of initial sharpness values are derived from the initial intensity values, the initial sharpness values are mapped to a set of corresponding enhanced sharpness values, and a set of enhanced intensity values are derived from the enhanced sharpness values to produce an enhanced raster image. As a result of the mapping, one or more of the enhanced sharpness values are greater than the corresponding initial sharpness values and one or more of the enhanced sharpness values are less than the corresponding initial sharpness values.

In another aspect, a background intensity value is determined for each pixel of the raster image based upon the initial intensity values for a plurality of pixels of the raster image, a set of initial sharpness values is derived from the background intensity values and the initial intensity values, the initial sharpness values are mapped to a set of corresponding enhanced sharpness values, and a set of enhanced intensity values are derived from the enhanced sharpness values and the background intensity values to produce an enhanced raster image.

In yet another aspect, a set of initial sharpness values is derived from the initial intensity values, a graphical representation of a mapping between initial sharpness values and a set of enhanced sharpness values is produced, the initial sharpness values are mapped to a different set of enhanced sharpness values in response to user actions upon the graphical representation, and a set of enhanced intensity values are derived from the enhanced sharpness values to produce an enhanced raster image.

Embodiments may include one or more of the following additional features.

Two or more sharpness value thresholds may be defined for selectively sharpening or selectively blurring pixels of the raster image. The enhanced sharpness values may vary nonlinearly as a function of corresponding initial sharpness values. A background intensity value may be determined for each pixel of the raster image, and the set of initial sharpness values may be derived from the background intensity values. Enhanced intensity values for the enhanced raster image may be produced from the background intensity values and the enhanced sharpness values. The background intensity value corresponding to a target pixel may be determined based upon the initial intensity values for a plurality of pixels of the raster image. The background intensity value corresponding to a target pixel may be determined based upon the initial intensity values of a plurality of pixels neighboring the target pixel. For example, the background intensity value corresponding to a target pixel may be the average or the median of the initial intensity values for pixels neighboring the target pixel. The background intensity value corresponding to a target pixel may be determined from the initial intensity value for each pixel that is adjacent to the target pixel.

The mapping between the magnitudes of initial sharpness values and the magnitudes of enhanced sharpness values may be displayed to the user. Alternatively, the mapping between the magnitudes of initial sharpness values and a representation of the amount by which initial sharpness values are increased or decreased to result in corresponding enhanced sharpness values. The amount by which initial sharpness values $S_{initial}$ are increased may be given by $$y \cdot (N - |S_{initial}|),$$

where $0 \leq y \leq 1$, $N \geq 0$, and $|S_{initial}|$ is the magnitude of the initial sharpness values; and the amount by which initial sharpness values are decreased may be given by $$y \cdot |S_{initial}|,$$

where $-1 \leq y < 0$. For an image with a depth of 8 bits, N may be set to 255. In another embodiment, the mapping between initial sharpness values and the difference between enhanced sharpness values and corresponding initial sharpness values may be displayed. In some embodiments, a representation of a logarithmic function of initial sharpness values may be displayed.

The mapping between enhanced sharpness values and initial sharpness values may be user-definable. A graphical representation of the mapping between initial sharpness values and enhanced sharpness values may be produced, and the mapping may be changed by modifying the graphical representation of the mapping with a pointing device.

The invention may be implemented as a computer program residing on a computer readable medium having instructions for causing a processor to perform the steps outlined above.

Among the advantages of the invention are the following. The invention enables a user to adjust the sharpness values in a raster image selectively and controllably to achieve desirable visual effects. For example, the invention enables a user to sharpen blurred regions of a raster image selectively without overly sharpening in-focus regions; alternatively, a user can de-emphasize some in-focus regions selectively and leave other regions unchanged. The invention enables a user to achieve other useful and desirable visual effects. By defining sharpness values with respect to a background intensity value that incorporates information about many pixel intensity values, the invention improves the enhancement of the raster image and provides a user with the flexibility needed to produce interesting and varied visual effects. Furthermore, by providing a user-modifiable graphical representation of the mapping between initial sharpness values and enhanced sharpness values, the invention enables a user to modify the visual effects produced by the invention quickly and easily.

Other features and advantages will become apparent from the following.

BRIEF DESCRIPTION OF THE DRAWINGS

FIG. 1 shows a raster image that has an out of focus region, an in-focus region, and a region to be de-emphasized.

FIG. 2 is a flow chart for a method for enhancing a raster image.

FIGS. 3A and 3B are flow diagrams of methods of enhancing a raster image.

FIG. 4A is a graphical representation of a target pixel surrounded by eight neighboring pixels.

FIG. 4B is a graphical representation of a plurality of pixels, including a target pixel 60 and a group of nine pixels 78 which are spaced-apart from the target pixel.

FIGS. 5A–5C are graphical representations of different mappings between initial sharpness values and enhanced sharpness values.

FIGS. 6A–6C are graphical representations of a development of a mapping between initial sharpness values and enhanced sharpness values as defined by a user.

FIGS. 7A and 7B are graphical representations of different graphical user interfaces that may be used to define mappings between initial sharpness values and enhanced sharpness values.

FIG. 8 is a block diagram of an apparatus for implementing a method of enhancing a raster image.

DESCRIPTION OF THE PREFERRED EMBODIMENTS

Referring to FIG. 1, a raster image 10 includes a plurality of pixels that define an out-of-focus region 14, an in-focus region 16, and a region to de-emphasize (blur) 18. Raster image 10 might, for example, correspond to an image created by a digital camera. In this example, out-of-focus region 14 might correspond to an object that was outside of the camera's focal range, in-focus region 16 might correspond to an object that was within the camera's focal range, and region 18 might correspond to a feature that a user would like to de-emphasize. The characterization of regions 14, 16 and 18 as out-of-focus, in-focus and to be de-emphasized is merely for illustrative purposes. Each region may in fact contain pixels with high sharpness values and pixels with low sharpness values. As described in detail below, a set of initial sharpness values $S_{initial}$ are derived from a set of initial intensity values $I_{initial}$ of raster image 10, the set of initial sharpness values are mapped to a set of enhanced sharpness values $S_{enhanced}$, and a set of enhanced intensity values $I_{enhanced}$ are derived to produce an enhanced raster image that may have some pixels that are sharper than the corresponding regions of raster image 10 and other pixels that are blurrier.

As shown in FIGS. 2 and 3A, a sharpness adjustment filter 20 is used to selectively vary the sharpness of different regions of raster image 10 to produce an enhanced raster image 22 in which the area corresponding to out-of-focus region 14 has been sharpened, the area corresponding to in-focus region 16 has not been changed, and the area corresponding to region 18 has been blurred. Sharpness adjustment filter 20 receives a set of initial intensity values 24 for the pixels in raster image 10 (step 26), determines a set of initial sharpness values (step 28), derives a corresponding set of enhanced sharpness values (step 30), and returns a set of enhanced intensity values 32 that define the pixels of enhanced raster image 22 (step 34). Steps 26–34 need not be performed in the sequence presented and some of these steps may be performed in parallel. Sharpness adjustment filter 20 can be applied to each color channel of raster image 10 separately, and the user may elect to apply sharpness adjustment filter to one or more of the color channels of raster image 10.

Referring to FIG. 3B, in one embodiment, sharpness adjustment filter 20 enhances raster image 10 as follows. The initial intensity values for the pixels are received (step 40). A background intensity value for each pixel is determined (step 42). Initial sharpness values are determined for each pixel (step 44). A user input is received (step 45) and a sharpness mapping is selected (step 46). Enhanced sharpness values are derived based-upon the user-selected sharpness mapping (step 48). Enhanced intensity values of enhanced raster image 22 are then produced based upon the enhanced sharpness values and the background intensity values (step 50).

Referring to FIGS. 4A and 4B, the background intensity values (step 42 in FIG. 3B) may be determined in a variety of ways. In one embodiment, the background intensity value associated with a target pixel 60 has a value that is a function $f$ of the intensity values of neighboring pixels $I_n$: $B_{target}=f(I_n)$. For example, $B_{target}$ may be the average of the intensity values for adjacent pixels 62–76:

$$B_{target} = \frac{\Sigma_n I_n}{8}, \text{ where } n = 1, \ldots, 8 \quad (1)$$

Alternatively, $B_{target}$ may be the median of the intensity values for adjacent pixels 62–76. Alternatively, $B_{target}$ may be determined based upon the intensity values for pixels located in an image area 78 (FIG. 4B) that is spaced-apart from target pixel 60 by one or more pixels. The background intensity value for a target pixel may also be a function of the intensity value for the target pixel itself: $B_{target}=f(I_i, I_{target})$ As used in this specification, the term "sharpness value" $S_{target}$ of a target pixel refers to the difference between the intensity value $I_{target}$ for the target pixel and the background intensity value $B_{target}$ for the target pixel:

$$S_{target}=I_{target}-B_{target} \quad (2)$$

Assuming each color channel of raster image 10 has a depth of 8 bits, $I_{target}$ and $B_{target}$ can each take on a value from 0 to 255, and $S_{target}$ can take on a value from –255 to 255. For each pixel i in a raster image, the initial sharpness value $S_{initial,i}$ and the corresponding enhanced sharpness value $S_{enhanced,i}$ are defined with respect to the assigned background intensity value $B_i$:

$$S_{initial,i}=I_{initial,i}-B_i \quad (3)$$

$$S_{enhanced,i}=I_{enhanced,i}-B_i \quad (4)$$

Thus, each pixel i in the resulting enhanced raster image has an enhanced intensity value $I_{enhanced,i}$ that is derived from the following formula:

$$I_{enhanced,i}=S_{enhanced,i}+B_i \quad (5)$$

Sharpness adjustment filter 20 receives a mapping from initial sharpness values $S_{initial}$ to enhanced sharpness values $S_{enhanced}$, and applies the enhanced sharpness values to raster image 10 to derive the enhanced intensity values $I_{enhanced}$ for the pixels of enhanced raster image 22 using equation (5). The relationship, or mapping, between initial sharpness values and enhanced sharpness values can be predetermined or user-defined. A user may also modify a predetermined sharpness value mapping. The user can select among different mappings between initial sharpness values and enhanced sharpness values to achieve different visual effects.

Referring to FIG. 5A, a first sharpness mapping 79 maps initial sharpness values $S_{initial}$ that are between S3 and S4 to enhanced sharpness values $S_{enhanced}$ along a unity filter line 80 which has a slope of 1 so that enhanced sharpness values are equal to corresponding initial sharpness values. Thus, the areas of raster image 10 with initial sharpness values that are between S3 and S4 are not changed. Initial sharpness values that are less than S3 are mapped to enhanced sharpness values along a curve 82 that lies above unity filter line 80, whereby the enhanced sharpness values are greater than corresponding initial sharpness values; that is, areas of raster image 10 with initial sharpness values that are less than S3 are sharpened. Initial sharpness values that are greater than S4 are mapped to enhanced sharpness values along a curve 84 which lies below unity filter line 80, whereby the enhanced sharpness values are decreased relative to the initial sharpness values. That is, areas of raster image 10 with initial sharpness values that are greater than S4 are blurred.

Referring to FIG. 5B, a second sharpness mapping 86 maps initial sharpness values that are less than S5 to enhanced sharpness values along curve 88 which lies below unity filter line 80, and maps initial sharpness values that are greater than S5 to enhanced sharpness values along unity filter line 80. The net result is that pixels of raster image 10 with initial sharpness values less than S5 are blurred, and pixels with initial sharpness values greater than S5 are not changed.

Referring to FIG. 5C, a third sharpness mapping 90 maps initial sharpness values that are less than S6 and initial sharpness values that are greater than S7 to enhanced sharpness values along unity filter line 80. Sharpness mapping 90 maps initial sharpness values between S6 and S7 to enhanced sharpness values along line 92 which lies above unity filter line 80. The result is that pixels of raster image 10 with initial sharpness values that are either less than S6 or greater than S7 are not changed, and pixels with initial sharpness values between S6 and S7 are sharpened by an amount that increases as the initial sharpness values decrease from S7 to S6.

Each of the sharpness mappings presented in FIGS. 5A–5C enables a user to enhance selectively and controllably different regions of a raster image. For example, sharpness mapping 79 (FIG. 5A) enables a user to sharpen blurred regions and to blur other regions, without overly sharpening regions that are in-focus. The sharpness mappings are displayed to the user on horizontal and vertical axes that represent the magnitudes of initial sharpness values $|S_{initial}|$ and the magnitudes of enhanced sharpness values $|S_{enhanced}|$, respectively. The sharpness mapping may alternatively be displayed on axes that represent the actual values of initial and enhanced sharpness (e.g., ranging from –255 to 255, assuming each color channel has an 8 bit depth).

As mentioned above, the invention enables a user to define one or more sharpness mappings for sharpness adjustment filter 20. Referring to FIGS. 6A–6C, in one embodiment, a user is presented with a graphical representation 100 of the mapping between initial sharpness values and enhanced sharpness values and is provided with a user-controllable icon 102 that can be used to modify graphical representation 100 and thereby change the underlying sharpness value mapping. A user is initially presented with a line 104 (FIG. 6A) that has a slope of 1, which graphically represents a unity filter. A user can change the sharpness mapping to blur image areas with low initial sharpness values by using icon 102 to drag a point 106 in a downward direction, indicated by arrow 108. The user can further change the sharpness mapping to sharpen image areas with high sharpness areas by using icon 102 to drag a point 110 (FIG. 6B) in an upward direction, indicated by arrow 112. As a result, initial sharpness values that are less than S8 (FIG. 6C) are mapped to enhanced sharpness values along a curve 114 which is below unity filter line 104, initial sharpness values that are greater than S9 are mapped to enhanced sharpness values along a curve 116 which is above unity filter line 104, and initial sharpness values between S8 and S9 are not changed.

In the embodiment of FIGS. 6A–6C, a user defines the sharpness mapping by modifying a predefined mapping between initial sharpness values and enhanced sharpness values. In another embodiment, a user can simply use a pointing device to draw a graphical representation of such a mapping onto, e.g., a computer display. Alternatively, a user can generate a graphical representation of such a mapping by piecing together lines and curves from a library, or toolbox, containing predefined lines and curves.

Referring to FIG. 7A, in another embodiment, a graphical user interface 120 enables a user to define a mapping between initial sharpness values and enhanced sharpness values. The scale in which graphical user interface 120 and equations (6) and (7), below, are presented is based upon the assumption that each color channel of the raster image being enhanced has an 8 bit depth; different bit depths can be easily accommodated changing the scale. The vertical axis y has a value between −1, which corresponds to the minimum possible sharpness value, and 1, which corresponds to the maximum possible sharpness value; the y-axis represents a percentage of an amount by which initial sharpness values will be increased or decreased to arrive at the corresponding enhanced sharpness values. The horizontal axis represents the magnitude of the initial sharpness values. Enhanced sharpness values are derived from the following formula:

$$S_{enhanced} = S_{initial} + y \cdot (N - |S_{initial}|) \text{ where } 0 \leq y \leq 1 \quad (6)$$

$$S_{enhanced} = S_{initial} + y \cdot |S_{initial}| \text{ where } -1 \leq y < 0 \quad (7)$$

N is a constant that is set to the maximum value of $|S_{initial}|$. For an image with a depth of 8 bits, N=255. A mapping 122 increases the sharpness of initial sharpness values that are between 0 and S10 and are between S11 and S12, and decreases the sharpness of initial sharpness values that are between S10 and S11 and are greater than S12.

Referring to FIG. 7B, in another embodiment, a graphical user interface 124 enables a user to define a mapping between initial sharpness values and enhanced sharpness values. The scale in which graphical user interface 124 is presented is based upon the assumption that each color channel of the raster image being enhanced has an 8 bit depth; different bit depths can be easily accommodated by changing the scale. The vertical axis y represents the difference between enhanced sharpness values and corresponding initial sharpness values. Enhanced sharpness values are derived from the following formula:

$$S_{enhanced} = S_{initial} + y \text{ where } -255 \leq y \leq 255 \quad (8)$$

Thus, a mapping 126 increases the sharpness of initial sharpness values that are between S13 and S14 and decreases the sharpness of initial sharpness values that are less than S13 or greater than S14.

In each of the embodiments described above, the scale of the horizontal axis may be adjusted to provide the user with greater flexibility in defining mappings between initial sharpness values and enhanced sharpness values. For example, in one embodiment, the horizontal axis corresponds to a logarithmic function of the initial sharpness values. Such a function has the advantage of providing a horizontal scale that emphasizes small initial sharpness values, providing the user with greater control when defining the sharpness mapping for small initial sharpness values. This function may be particularly useful for enhancing images that have sharpness values that lie predominantly in a lower range of the sharpness scale; for example, some images may have sharpness values that lie predominantly in the magnitude range of 0 to 30 on a magnitude scale of 0 to 255, assuming an 8 bit depth. In another embodiment, the user can adjust the scale of the axis over which the initial sharpness values are displayed to emphasize initial sharpness values of interest.

Referring to FIG. 8, the invention may be implemented in digital electronic circuitry or in computer hardware, firmware, software, or in a combination of these forms. Apparatus of the invention may be implemented in a computer program product tangibly embodied in a machine-readable storage device for execution by a computer processor, and method steps of the invention may be performed by a computer processor executing a program to perform functions of the invention by operating on input data and generating output. Suitable processors 130 include, by way of example, both general and special purpose microprocessors. Generally, a processor will receive instructions and data from a read-only memory (ROM) 132 and/or a random access memory (RAM) 134. Storage devices suitable for tangibly embodying computer program instructions include all forms of non-volatile memory, including by way of example semiconductor memory devices such as EPROM, EEPROM, and flash memory devices, magnetic disks such as internal hard drives and removable disks 136, magneto-optical disks, and CD ROM disks. Any of the foregoing may be supplemented by, or incorporated into, specially-designed ASICs (application-specific integrated circuits). By way of example, a raster imaging device 138 includes a microprocessor 140 for executing program instructions stored on a RAM 142 and a ROM 144 and controlling a raster engine 146. RAM 142 can be supplemented by a hard disk or a high-capacity removable disk. The invention can be used in conjunction with any digital print engine or marking engine, display monitor, or other raster output device capable of producing color or gray scale pixels on paper, film, display screen, or other output medium.

Other embodiments are within the scope of the claims.

What is claimed is:

1. A method of producing an enhanced raster image from a raster image having a plurality of pixels with respective initial intensity values, the method comprising:

deriving a set of initial sharpness values from the initial intensity values;

mapping the initial sharpness values to a set of corresponding enhanced sharpness values, wherein as a result of the mapping one or more of the enhanced sharpness values are greater than the corresponding initial sharpness values and one or more of the enhanced sharpness values are less than the corresponding initial sharpness values; and deriving a set of enhanced intensity values from the enhanced sharpness values to produce an enhanced raster image, whereby a user can selectively sharpen some regions of the raster image and can selectively blur other regions of the raster image and thereby produce the enhanced raster image.

2. The method of claim 1 further comprising enabling a use to define two or more sharpness value thresholds for selectively sharpening or selectively blurring pixels of the raster image.

3. The method of claim 1 wherein the enhanced sharpness values may vary nonlinearly as a function of corresponding initial sharpness values.

4. The method of claim 1 wherein deriving a set of initial sharpness values comprises determining a background intensity value for each pixel of the raster image, and deriving the set of initial sharpness values from the background intensity values.

5. The method of claim 4 further comprising producing enhanced intensity values for the enhanced raster image from the background intensity values and the enhanced sharpness values.

6. The method of claim 4 wherein the background intensity value of a target pixel is determined based upon the initial intensity values for a plurality of pixels of the raster image.

7. The method of claim 6 wherein the background intensity value corresponding to a target pixel is determined based upon the initial intensity values of a plurality of pixels on a neighborhood around the target pixel.

8. The method of claim 4 wherein the background intensity value corresponding to a target pixel is the average of the initial intensity values for pixels neighboring the target pixel.

9. The method of claim 4 wherein the background intensity value corresponding to a target pixel is the median of the initial intensity values for pixels neighboring the target pixel.

10. The method of claim 4 wherein the background intensity value corresponding to a target pixel is determined from the initial intensity value for each pixel that is adjacent to the target pixel.

11. The method of claim 1 wherein the mapping between enhanced sharpness values and initial sharpness values is user-definable.

12. The method of claim 1 further comprising producing a graphical representation of the mapping between initial sharpness values and enhanced sharpness values.

13. The method of claim 12 further comprising receiving user input to change the mapping between initial sharpness values and enhanced sharpness value the user input modifying the graphical representation of the mapping with a pointing device.

14. A method of producing an enhanced raster image from a raster image having a plurality of pixels with respective intensity values, the method comprising:
    deriving a background intensity value for each pixel of the raster image based upon the initial intensity values for a plurality of pixels of the raster image;
    deriving a set of initial sharpness values from the background intensity values and the initial intensity values;
    mapping the initial sharpness values to a set of corresponding enhanced sharpness values; and
    deriving a set of enhanced intensity values from the enhanced sharpness values and the background intensity values to produce an enhanced raster image.

15. The method of claim 14 wherein a background intensity value corresponding to a target pixel is determined based upon the initial intensity values for a plurality of pixels neighboring the target pixel.

16. The method of claim 14 wherein a background intensity value corresponding to a target pixel is determined based upon the initial intensity values for a plurality of pixels that are spaced-apart from the target pixel.

17. The method of claim 14 wherein the determination of a background intensity value corresponding to a target pixel is independent of the initial intensity value for the target pixel.

18. A method of producing an enhanced raster image from a raster image having a plurality of pixels with respective initial intensity values, the method comprising:
    deriving a set of initial sharpness values from the initial intensity values;
    producing a graphical representation of a mapping between initial sharpness values and a set of enhanced sharpness values;
    mapping initial sharpness values to a different set of enhanced sharpness values in response to user actions upon the graphical representation; and
    deriving a set of enhanced intensity values from the enhanced sharpness values to produce an enhanced raster image.

19. The method of claim 18 further comprising changing the mapping between initial sharpness values and enhanced sharpness values by modifying the graphical representation of the mapping.

20. The method of claim 19 wherein the graphical representation is modified with a pointing device.

21. The method of claim 18 wherein producing a graphical representation comprises displaying the mapping between the magnitudes of initial sharpness values and the magnitudes of enhanced sharpness values.

22. The method of claim 18 wherein producing a graphical representation comprises displaying the mapping between the magnitudes of initial sharpness values and a representation of the amount by which initial sharpness values are increased or decreased to result in corresponding enhanced sharpness values.

23. The method of claim 22 wherein the amount by which initial sharpness values $S_{initial}$ are increased is given by $$y \cdot (N - |S_{initial}|),$$

where $0 \leq y \leq 1$ and $N \geq 0$, and the amount by which initial sharpness values are decreased is given by $$y \cdot |S_{initial}|,$$

where $-1 \leq y < 0$.

24. The method of claim 18 wherein producing a graphical representation comprises displaying the mapping between initial sharpness values and the difference between enhanced sharpness values and corresponding initial sharpness values.

25. The method of claim 18 wherein producing a graphical representation comprises displaying a representation of a logarithmic function of initial sharpness values.

26. A method of producing an enhanced raster image from a raster image having a plurality of pixels with respective initial intensity values, the method comprising:
    deriving a background intensity value for each pixel of the raster image based upon the initial intensity values for a plurality of pixels of the raster image;
    deriving a set of initial sharpness values from the background intensity values and the initial intensity values;
    producing a graphical representation of a mapping between initial sharpness values and a set of enhanced sharpness values;
    mapping initial sharpness values to a different set of enhanced sharpness values in response to user actions upon the graphical representation; and
    deriving a set of enhanced intensity values from the enhanced sharpness values and the background intensity values to produce an enhanced raster image.

27. An apparatus for producing an enhanced raster image from a raster image having a plurality of pixels with respective initial intensity values, the apparatus comprising a sharpness adjustment filter adapted to derive a set of initial sharpness values from the initial intensity values and to derive a set of corresponding enhanced sharpness values from the set of initial sharpness values, wherein one or more of the enhanced sharpness values are greater than the corresponding initial sharpness values and one or more of the enhanced sharpness values are less than the corresponding initial sharpness values, the sharpness adjustment filter being further adapted to derive a set of enhanced intensity values from the enhanced sharpness values to produce an enhanced raster image, whereby a user can selectively sharpen some regions of the raster image and can selectively blur other regions of the raster image and thereby produce the enhanced raster image.

28. A computer program residing on a computer readable medium having instructions for causing a processor to:

derive a set of initial sharpness values from the initial intensity values;

map the initial sharpness values to a set of corresponding enhanced sharpness values; and derive a set of enhanced intensity values from the enhanced sharpness values to produce an enhanced raster image, wherein a user can selectively sharpen some regions of the raster image and can selectively blur other regions of the raster image and thereby produce the enhanced raster image.

* * * * *